Patented Jan. 30, 1940

2,188,707

UNITED STATES PATENT OFFICE 2,188,707

HARDWARE FOR CEDAR CHESTS AND THE LIKE

Ernest C. Crocker, Belmont, Mass., assignor, by mesne assignments, to The Lane Company, Inc., a corporation of Virginia No Drawing. Application February 19, 1938, Serial No. 191,572

10 Claims. (Cl. 91—68)

This invention relates to the provision of hardware suitable for use in the construction of cedar chests and similar receptacles which enclose a space filled with an atmosphere laden with cedar aroma and are adapted for the storage of furs, woolen garments, and the like for the protection of the same against attack by moths.

It is difficult and inconvenient to construct a cedar storage receptacle in such manner that the hardware used, such as the hinges, lock, etc., are not exposed to the cedar aroma laden atmosphere of the receptacle. On the other hand it is desirable, in the construction of such receptacles, to include additional metal hardware, such as hooks, rods, sealing strips, holdbacks and the like. The better makes of cedar chests provide a storage space, the atmosphere of which is so heavily laden with cedar aroma that the formation of gummy deposits on the hardware exposed to the enclosed atmosphere presents a serious problem.

Metals which are commonly used for the construction of hardware of the type used in cedar chests, such as iron, brass, bronze and copper, are susceptible to the formation of gummy deposits on their surfaces when exposed to a cedar aroma laden atmosphere, but it has been proposed (see my U. S. Patent No. 2,023,465) to provide hardware made of or presenting a surface of a metal which is non-catalytic to the formation of gummy deposits thereon when exposed to cedar aroma.

I have now found that the deposition of gummy deposits on the metal hardware exposed to the aroma laden atmosphere of cedar chests and the like may be avoided by coating the hardware with a suitable lacquer. Ordinary varnishes or coating compositions containing drying oils, gums and resins are not suitable for this purpose, but may be positively detrimental because drying oils, gums and resins attract and absorb cedar oil from the cedar aroma laden atmosphere and become gummy. I have found, however, that polymerized unsymmetrical ethylene derivative resins, of the class set forth below, not only do not attract and absorb the cedar oil and become gummy, but also insulate the catalytic action of the catalytic metals. The class of resins to which I refer includes polystyrene, polymers of inorganic and of organic esters of vinyl alcohol, copolymers of the inorganic esters of vinyl alcohol with the organic esters thereof, and polymers of acrylic acid and its derivatives. These are all polymerized unsymmetrical ethylene derivative resins, and thus they all contain the monovalent group $CH_2=CH-$. In some instances (e. g. methyl methacrylate) the hydrogen of the CH group may be replaced by an alkyl radical, such as $CH_3$.

Polystyrene (also referred to as metastyrene) is polymerized styrene, $CH_2=CH-C_6H_5$, and is obtainable under a number of trade names. It is commonly made by heating styrene, with or without catalysts. It is soluble in various organic solvents, such as petroleum hydrocarbons, and can be applied, in such solvents, as a lacquer, in carrying out this invention.

The principal inorganic esters of vinyl alcohol are the chloride and the bromide, $$CH_2=CH-Cl$$

and $$CH_2=CH-Br$$

These materials polymerize easily, by procedures already well known, and may be made up as lacquers by dissolving in suitable organic solvents. Organic esters of vinyl alcohol include the acetate ($CH_2=CH-O-CO-CH_3$), the propionate, the butyrate, etc.; of these the acetate is best known. They may be polymerized readily by known methods, and the polymers may be made up as lacquers. Copolymers of organic and inorganic esters of vinyl alcohol are commonly prepared by polymerizing, for example, vinyl chloride and vinyl acetate. Procedures for carrying out this copolymerization are well known; see, for example, U. S. Patent No. 2,052,658. The relative amounts of organic to inorganic ester may be varied, in accordance with the characteristics desired in the final product.

Acrylic acid, $CH_2=CH-COOH$, may readily be polymerized by known methods, e. g., by heat and a catalyst to form polyacrylic acid. Polymerized derivatives of acrylic acid may be prepared by first preparing the derivative, e. g., the methyl, ethyl or propyl ester, the chloride, etc., and then polymerizing, by known methods.

The invention, therefore, resides in the provision of hardware having a non-gumming lacquer coating for use in cedar chests and the like. The metal of the hardware may be either catalytic, or not, but preferably is relatively non-catalytic so that in the event that the lacquer is scratched or worn from the metal surface, the tendency to the formation of gummy deposits on the exposed metal will be minimized. The metal of the hardware may be wholly non-catalytic, or it may consist of a catalytic metal bearing a non-catalytic coating. The lacquer coating should, of course, be strong and durable, but may be colorless or colored or pigmented.

Although the composition of the metal hardware forms no part of the present invention, this feature having been disclosed and claimed in my Patent No. 2,023,465 and in my application Serial No. 40,996, filed September 17, 1935, it may be noted that the non-catalytic metals include aluminum, cadmium, silver, tin, zinc, chromium, tungsten, and magnesium and alloys thereof such as duralium and Dow metal.

The invention will be illustrated hereinafter by reference to its preferred embodiment, i. e., non-catalytic metal hardware bearing a coating of resin of the class herein defined.

As stated above, the metal base of the hardware may consist of a catalytic metal, such as iron, copper, brass, or bronze, but preferably it consists of a non-catalytic metal, such as aluminum, cadmium, silver, tin, zinc, chromium, tungsten or magnesium, or their alloys, such as duralium or Dow metal, or of a supporting structure of a metal, such as iron, coated with one of the non-catalytic metals. The lacquer coating conveniently consists of a solution of the polymerized unsymmetrical ethylene derivative resin in a suitable solvent. The lacquer should, of course, be free of gums or resins or oils or plasticizing agents which are known to have an affinity for cedar oil.

In a specific instance a bronze sealing strip for a cedar chest was coated with a 10% solution of a conjoint polymer of vinyl chloride and vinyl acetate in acetone and dried and baked at about 250° F. The resulting lacquer finish was strong, hard and tough, adhered well to the metal and was free of any tendency to become soft or gummy or to accumulate oily or gummy deposit on its surface when exposed to the cedar aroma laden atmosphere of a cedar chest which was capable of showing such effects on iron. Similar results were obtained on nickel plated hardware.

Similar procedure was followed with equally good results, by applying other lacquers containing resins of the type herein described. For example, methyl methacrylate polymer (a polymerized ester of methyl acrylic acid) dissolved in acetone was used as a lacquer, in which form it was applied to the metal; a very satisfactory coating was obtained, free of any tendency to become gummy. As another example, a simple vinyl acetate polymer was made up as a lacquer and applied in the same manner, with equally good results. In these last two instances it was not found necessary to bake the coating, as the resin hardened sufficiently when the solvent dried out, and the resulting coating was entirely suitable for the purposes of this invention.

The baking of the copolymer vinyl chloride-vinyl acetate resin lacquer coating is desirable but not essential. Baking serves to enhance the smoothness of the coating and its adherence to the metal. The baking temperature may vary from about 225 to about 300° F. The lacquer may contain other film-forming ingredients, such as pyroxylin, which are neutral to cedar aroma.

Upon being tested in the aroma laden atmosphere of a cedar chest the lacquered hardware showed no oxidation catalytic effect or tendency to become sticky or gummy or accumulate oily or gummy deposits.

This application is a continuation-in-part of my application Serial No. 72,674, filed April 3, 1936.

I claim:

1. Metal hardware constituting a part of and exposed to the cedar aroma laden atmosphere within a storage receptacle, said hardware having a coating of a lacquer consisting essentially of a polymerized unsymmetrical ethylene derivative resin selected from the group consisting of resins formed by the polymerization of compounds containing the group $CH_2=CR-$ in which R is a member of the group consisting of hydrogen and alkyl radicals.

2. Metal hardware as defined in claim 1 in which at least the metal surface of the hardware consists of a non-catalytic metal.

3. Metal hardware as defined in claim 1 in which at least the metal surface of the hardware consists of a metal of the group consisting of aluminum, cadmium, silver, tin, zinc, chromium, tungsten, magnesium, and alloys thereof.

4. Metal hardware as defined in claim 1 in which the lacquer coating consists essentially of a resin formed by the polymerization of an ester of vinyl alcohol.

5. Metal hardware as defined in claim 1 in which the lacquer coating consists essentially of a resin formed by the conjoint polymerization of an organic ester and an inorganic ester of vinyl alcohol.

6. Metal hardware as defined in claim 1 in which the lacquer coating consists essentially of a resin formed by the conjoint polymerization of vinyl chloride and vinyl acetate.

7. Metal hardware as defined in claim 1 in which the lacquer coating consists essentially of a resin formed by the conjoint polymerization of vinyl chloride and vinyl acetate which has been baked at a temperature of from about 225° F. to about 300° F.

8. Metal hardware as defined in claim 1 in which the lacquer coating consists essentially of a resin formed by the polymerization of an acrylic acid compound.

9. Metal hardware as defined in claim 1 in which the lacquer coating consists essentially of a resin formed by the polymerization of an ester of acrylic acid.

10. Metal hardware as defined in claim 1 in which the lacquer coating consists essentially of a resin formed by the polymerization of methyl methacrylate.

ERNEST C. CROCKER.